United States Patent Office 3,260,683
Patented July 12, 1966

3,260,683
METHOD OF PREPARING A CATALYST COMPOSITION CONSISTING OF THE OXIDES OF COBALT AND MAGNESIUM AND THE PRODUCT THEREOF
Harry Hermann Alfred Endler, Ferrara, Italy, assignor to Montecatini, Società Generale per l'Industria Mineraria e Chimica, Milan, Italy, a corporation of Italy
No Drawing. Filed June 26, 1961, Ser. No. 119,349
Claims priority, application Italy, June 27, 1960, 11,389/60
5 Claims. (Cl. 252—473)

My invention relates to the reduction of oxo-compounds such as aldehydes, acids and esters, to the corresponding alcohols.

These compounds are obtained, either separately or in the form of mixtures, in the hydroformylation process of olefines with water-gas, e.g. in the hydroforming of propylene with carbon monoxide and hydrogen, in the presence of a cobalt carbonyl catalyst, butyric aldehydes are formed. In order to prepare higher alcohols, said aldehydes, particularly the normal butyric aldehyde, are converted to alcohols through aldol condensation and subsequent hydrogenation. In the propylene oxosynthesis, in addition to butyric aldehydes which are obtained as the main product, various by-products are formed, whose recovery is of particular importance for the process economy, owing to their large amount. A typical mixture of said by-products shows on analysis the following average characteristics:

NCO (carbonyl number) _____ 120–210
NA (acidity number) _____ 5–50
NOH (hydroxyl number) _____ 100–300
NS (saponification number) _____ 35–150

Said mixture, therefore, is formed of either $C_4$ or higher aldehydes, acids, alcohols and esters; the aldehydes being partially present as acetals.

According to my invention, the conversion of said compounds to valuable substances, particularly hydroxylated compounds, occurs by means of hydrogenation with molecular hydrogen or also with hydrogen-containing gases, under high pressure and in the presence of a catalyst obtained by coprecipitation of cobalt or other group eight metals of the periodic system with magnesium, as salts of dibasic organic acids.

It is known that the reduction of esters, acids and aldehydes to the corresponding alcohols is industrially achieved with some types of catalysts, among which copper chromite (according to Adkins-Bourgoyne) has proved to be particularly suitable.

Catalysts based on metallic iron, metallic cobalt or metallic nickel have proved to be unsuitable for the hydrogenation of the above-mentioned mixtures; only the aldehydes contained in the oxomixture can be hydrogenated with said metallic catalysts.

An object of this invention is to obviate the above difficulties and prepare a catalyst with very good hydrogenating properties in the specific reduction of esters and acids either separately or in admixture with aldehydes, said catalyst containing as active components the cobalt or another non-noble metal of group eight and magnesium. Such a catalyst is prepared by coprecipitation of cobalt and magnesium as insoluble salts of dibasic organic acids and subsequent thermal decomposition in a stream of inert gas.

Coprecipitation of magnesium with iron or nickel leads likewise to formation of suitable catalysts, however the combination Co-Mg is preferable for many reasons.

The coprecipitation is carried out, generally, by employing an aqueous solution containing the respective cobalt and magnesium salts in equimolecular ratio; however, good results are obtained with different ratios, too. Equally active catalysts have been obtained by coprecipitation of Co-Mg in the ratio 10:1, or 1:2.

Replacement of magnesium, as a component of the catalyst, by other metals of the alkaline-earth group leads to the formation of catalysts which display a lower activity in the hydrogenation of aldehydes, acids and esters present in the oxo-products.

Preparation of catalysts is performed by coprecipitation of Co-Mg from an aqueous solution of the respective salts, by means of organic acids which form insoluble salts of the two metals employed; in the subsequent stage of decomposition by heating, no fusion of the precipitate should occur. Particularly suitable for this purpose are dibasic organic acids, aliphatic or aromatic, which also yield fine crystalline precipitates.

It is fundamentally important that, during the thermal treatment, the coprecipitate decomposes readily by decarboxylation without leaving any organic residue. Thermic decomposition is carried out profitably with a slow stream of inert gas; e.g. nitrogen, carbon dioxide, methane, air and other gases. The employment of oxygen-containing gases is less advisable, owing to the formation of catalysts having lower activity.

A desirable decomposition temperature is about 400° C., although active catalysts are obtained also by thermic treatment at 350° C. or at 700° C. Generally a very fine catalytic powder is obtained, having an average diameter of particles in the range from 0.1 to $5\mu$; specific surface measure according to the method of Lea, F. M., and Nurse, R. W., modified by H. E. Rose, is at least about 50,000 sq. cm./gr. and is generally about 100,000 sq. cm./gr.; density is 3.4 and the particles have an average diameter of $0.18\mu$.

Hereinafter other features are reported in order to give a better characterization of the catalyst:

Thermic decomposition of oxalates occurs with a strong release of carbon dioxide. The catalyst obtained is in the form of a black powder of cobaltous oxide and magnesium oxide, as shown by chemical analysis. Sometimes the finished catalyst may also contain a small amount of unchanged magnesium oxalate, especially when the decomposition is performed in the presence of nitrogen as the inert gas. Moreover the catalytic powder contains amorphous carbon which, when occurring in a sufficient fineness, may take fire on contact with air.

X-ray investigation of the catalyst, performed according to the Debye method, confirms the occurrence of cobaltous oxide and magnesium oxide. No precise answer can be given about the presence of a mixture of the two oxides or of a single crystalline phase formed of a mixed oxide, since the two oxides are isomorphous and form mixed crystals in whatever ratio.

It should be understood that the above-mentioned elements are not to be regarded as limitations of catalyst composition, nor have they been given in order to construe the hydrogenation mechanism by said catalyst. According to the present invention, the catalyst is constituted of all the mixtures of oxides of cobalt or of another non-noble metal of the eighth group with the oxide of magnesium or of other similar metals, said mixtures being obtained by thermic treatment of coprecipitated salts of dibasic organic acids in a stream of inert gas.

The catalyst, owing to its remarkable fineness, lends itself to be employed in suspension. The catalytic powder is introduced into an autoclave or into a reactor, suspended in either a solvent or in the very substance to be hydrogenated. Usually the catalyst is employed in the amount of 1–3%; however, as necessities require, said amount may increase up to 10%.

Hydrogenation of esters, acids, aldehydes, etc. is preferably carried out with said catalyst at a pressure of more than 200 atm. of hydrogen and at temperatures above 200° C.; it is possible to operate also at temperature and pressure lower than said values. Hydrogenation may be effected batchwise in autoclave, or also continuously by pumping the reaction mixture together with suspended catalyst into a pressurized reactor.

The examples which follow are submitted to illustrate, and not to limit, this invention.

*Example 1*

291 g. of $Co(NO_3)_2 \cdot 6H_2O$ (1 mole) and 256 g. of $Mg(NO_3)_2 \cdot 6H_2O$ (1 mole) are dissolved in four liters of water. To this solution 284 g. of $(NH_4COO)_2 \cdot H_2O$ (2 moles) dissolved in 2 liters of water are added at 70° C. under stirring. The precipitate is decanted and washed 3 times with warm water (70° C.), then filtered. After drying at 110° C. for 10 hours, the precipitate is decomposed at 400° C. in a tubular oven in a slow nitrogen stream, for six hours. At the end of thermal treatment the mass is allowed to cool while remaining in a nitrogen stream, the finished catalyst is then poured into a vessel into which isobutanol has been charged. 300 ml. of isobutyl isobutyrate together with 10 g. of the Co-Mg catalyst prepared as above described are charged into an autoclave of Inox steel. The temperature is brought up to 200° C. and pressure to 250 atm. of hydrogen. Said conditions are maintained for several hours, while replenishing the hydrogen gas as it is consumed. At reaction end a product of the following composition is obtained: NA—1.1; NOH—712.5; NS—21.70. A hydrogenation yield of 94.3% is calculated from a saponification number (theoretical number (theoretical) 388.5 of the $C_4$—$C_4$ ester.

*Example 2*

50 g. of Co-Mg catalyst, prepared according to Example 1, in 1000 g. of butyl-2-ethylhexanoate are charged into an autoclave of Inox steel. Temperature is brought to 200° C., and pressure to 250 atm. hydrogen, replenishing the gas as it is being consumed. Upon termination of the reaction, a product of the following composition is obtained: NA—8.7; NOH—457; NS—24.7. A hydrogenation yield of 91.5% is calculated from a theoretical saponification number 280 of the ester employed.

*Example 3*

300 g. of 2-ethylhexanol and 10 g. of Co-Mg catalyst prepared according to Example 1 are charged into an autoclave of Inox steel. Temperature is brought up to 200° C., and pressure to 250 atm. hydrogen, while replenishing the hydrogen as it is being consumed. Upon termination of the reaction, a product showing the following analytical data is obtained: NCO—0.7; NA—0; NOH—406.3; NS—0. It appears from the carbonyl number that the aldehyde hydrogenation has occurred with a practically quantitative yield.

*Example 4*

The Co-Mg catalyst prepared according to Example 1 is employed for the hydrogenation of stearic acid. A saturated solution of stearic acid in cyclohexane, having an acidity number of 20.6, is charged together with 5 g. of catalyst into an autoclave of Inox steel. Temperature is raised up to 200° C. and pressure to 250 atm. hydrogen. Upon termination of the reaction, after seven hours, the acidity number is 1.1, with complete hydrogenation of the acid.

*Example 5*

In order to show the activity of the Co-Mg catalyst on the hydrogenation of a mixture of aldehydes, acids and esters, the by-products originating from propylene oxosynthesis were hydrogenated. The employed mixture, containing various oxocompounds with four or more carbon atoms, shows the following composition: NCO—102.2; NA—17.5; NOH—409.3; NS—95.9. 1000 g. of the described mixture together with 50 g. of the Co-Mg catalyst prepared according to Example 1 are charged into an autoclave of Inox steel. Temperature is raised to 200° C. and pressure to 250 atm. hydrogen, while gradually replenishing the consumed hydrogen. At the end of the reaction, a product showing the following analytical data is obtained: NCO—0; NA—0; NOH—638; NS—15.3. It is apparent from said data that all the reducible compounds, regardless of a little amount of ester, have been converted to alcohols.

*Example 6*

This example shows the activity of the catalyst obtained by coprecipitation of Co-Mg as salts of other dibasic organic acids, either aliphatic or aromatic, and subsequent thermic decomposition of said salts.

One mole of $Co(NO_3)_2 \cdot 6H_2O$ and one mole of $Mg(NO_3)_2 \cdot 6H_2O$ are dissolved in water and coprecipitated with two moles of the ammonium salt originating from the acids: adipic, succinic, tartaric, terephthalic, at 70° C. and under stirring. The precipitates of the salts obtained are decanted and washed 3 times with warm water, then filtered. After drying, the crystalline powder is decomposed in a tubular oven at 400° C. in a slow nitrogen stream.

The hydrogenation test is carried out by charging into an autoclave of Inox steel a mixture of oxocompounds together with 10% of each catalyst prepared, suspended in isobutanol as a solvent. Temperature is raised up to 200° C. and pressure to 250 atm. hydrogen, while replenishing the hydrogen as it is being consumed. The results of said hydrogenations are reported in the following table.

TABLE FOR EXAMPLE 6

| Co-Mg catalysts obtained by coprecipitation with $NH_4$-salts of— | Analytical data | | | | | | | |
| --- | --- | --- | --- | --- | --- | --- | --- | --- |
| | Before hydrogenation | | | | After hydrogenation | | | |
| | NCO | NA | NOH | NS | NCO | NA | NOH | NS |
| Adipic acid | 153 | 8.4 | 141 | 77.2 | 0 | 0.8 | 580 | 3.6 |
| Succinic acid | 153 | 8.4 | 141 | 77.2 | 0 | 0.18 | 479 | 15.4 |
| Tartaric acid | 88.9 | 16.3 | 421.5 | 91.9 | 1.8 | 0.74 | 607 | 30.3 |
| Terephthalic acid | 88.9 | 16.3 | 421.5 | 91.9 | 0.47 | 1.36 | 542 | 26.7 |

*Example 7*

One mole of $Co(NO_3)_2 \cdot 6H_2O$ and one mole of $Mg(NO_3)_2 \cdot 6H_2O$ are dissolved in water and coprecipitated with two moles of $(NH_4COO)_2 \cdot H_2O$ at 70° C. under stirring. The precipitate of Co-Mg oxalates is decanted and washed 3 times with warm water, then filtered. After drying, the crystalline powder is decomposed in a tubular oven at 380° C., in a slow stream of air; in lieu of air also methane may be successfully employed.

20 g. of Co-Mg catalyst, suspended in 100 ml. of isobutanol, are charged together with 200 ml. of a mixture of oxocompounds into na autoclave of Inox steel. The composition of the starting mixture appears from the following analytical data: NCO—102.2; NOH—409.3; NA—17.50; NS—95.8. Temperature is raised up to 200° C. and pressure to 250 atm. hydrogen while replenishing the hydrogen as it is being consumed. At the end of the reaction a product is obtained showing the following analytical data: NCO—0; NOH—593.9; NA—0.77; NS—28.

*Example 8*

The following example is given in order to show that the composition of catalyst may be varied as regards the ratio Co-Mg.

582 g. of $Co(NO_3)_2 \cdot 6H_2O$ (2 moles) and 256.4 g. of $Mg(NO_3)_2 \cdot 6H_2O$ (1 mole) are dissolved in 6 liters of water. To this solution 426 g. of $(NH_4COO)_2 \cdot 2H_2O$ (3 moles) dissolved in 3 liters of water are added at 70° C. under stirring. The precipitate is decanted and washed 3 times with warm water (70° C.), then filtered; after drying at 110° C. for 10 hours the coprecipitate is decomposed at 380° C. in a tubular oven in a slow nitrogen stream, for six hours. The catalyst so obtained is kept in a vessel containing isobutanol. 20 g. of the catalyst, suspended in 100 ml. of isobutanol, and 200 ml. of a mixture of by-products originating from propylene oxosynthesis are charged into an Inox steel autoclave; said mixture having the following starting composition: NCO—153.2; NA—8.4; NOH—141.6; NS—77.2. Temperature is raised at 200° C. and pressure to 250 atm. hydrogen, while replenishing the hydrogen as it is being consumed. At the end of the reaction a product is obtained having the following analytical data: NCO—0; NA—0.96; NOH—506.4; NS—15.3.

*Example 9*

$Co(NO_3)_2 \cdot 6H_2O$ and $Mg(NO_3)_2 \cdot 6H_2O$ in the molecular ratio 10:1 are coprecipitated in the same way as in Example 1 and subsequently decomposed as usually. 300 g. of a mixture of oxocompounds, containing esters, acids and aldehyde, together with 15 g. of said catalyst suspended in 30 g. of isobutanol are hydrogenated in an Inox steel autoclave. The starting mixture has the following composition: NCO—88.9; NA—16.3; NOH—421.5; NS—91.9. Hydrogenation is carried out at 200° C. and 250 atm. hydrogen, while replenishing the hydrogen as it is being consumed. At the end of the reaction a product is obtained showing the following data: NCO—0; NA—0.3; NOH—630; NS—19.8.

*Example 10*

In order to vary the Co-Mg ratio in the finished catalyst, the oxalate of the two metals was coprecipitated in the molecular ratio 1:2. The obtained precipitate was then decomposed as described in Example 1. Said catalyst was tested with the same oxoproducts and in the same way as in Example 7. At the end of the hydrogenation a product is obtained showing the following data: NCO—0; NA—0.15; NOH—494.3; NS—14.7. In this case, too, all the reducible products were practically converted to alcohols.

*Example 11*

In order to show the possibility of carrying out the decomposition at higher temperature, a coprecipitate of Co-Mg oxalates, prepared as described in Example 1, was decomposed in a tubular oven at 700° C. in a slow nitrogen stream. 10 g. of the catalytic powder so obtained, suspended in 2P ml. of isobutanol, are charged together with 200 ml. of a mixture of oxocompounds into an Inox steel autoclave. The starting mixture has the following composition: NCO—88.9; NA—16.3; NOH—421.5; NS—91.9. Hydrogenation is effected at 200° C. and 250 atm. hydrogen, while replenishing the hydrogen as it is being consumed. At the end of the reaction, a product is obtained having the following composition: NCO—0; NA—0.5; NOH—612; NS—22.

*Example 12*

In order to show the possibility of carrying out the decomposition at a temperature less than 400° C., a corprecipitate of Co-Mg oxalates, prepared as described in Example 1, was decomposed in a tubular oven at 350° C. in a slow nitrogen stream. 15 g. of said catalyst, suspended in 30 ml. of isobutanol, are charged together with 300 ml. of ethyl acetate into an Inox steel autoclave. The hydrogenation test was performed under usual conditions, at 200° C. and 250 atm. hydrogen. After 9 hours, 50% of the ester had been hydrogenated, as is shown by the following analytical data: initial NS—581; initial NOH—55; final NS—248; final NOH—600.

*Example 13*

One mole $Fe(NO_3)_2$ and one mole $Mg(NO_3)_2 \cdot 6H_2O$ are dissolved in water and coprecipitated with two moles of $(NH_4COO)_2 \cdot H_2O$ at 70° C. under stirring. The precipitate of Fe-Mg oxalates is decanted and washed 3 times with warm water, then filtered. After drying, the crystalline powder is decomposed in a tubular oven at 380° C. in a slow nitrogen stream. 20 g. of Fe-Mg catalyst, suspended in 100 ml. of isobutanol, are charged together with 200 ml. of a mixture of oxocompounds into an Inox steel autoclave. The composition of the starting mixture appears from the following analytical data: NCO—88.9; NA—16.3; NOH—421.5; NS—91.9. Temperature is raised to 200° C. and pressure to 250 atm. hydrogen, while replenishing the hydrogen as it is gradually consumed. At the end of the reaction a product is obtained showing the following analytical data: NCO—0; NA—0.44; NOH—600; NS—23.

The above-described examples show clearly the catalytic activity of Co-Mg or similar catalysts for the conversion of aldehydes, acids and esters etc. to hydroxylated compounds, analogously to that obtained with the use of copper chromite type catalysts. The employment of the new Co-Mg catalyst in the hydrogenation of mixtures of oxocompounds allows said mixtures to be converted to valuable alcohols.

In comparison with copper chromite, the Co-Mg catalyst shows the advantage of being less expensive, of being obtained through a simple preparation process, and of being easily recoverable after employment, by a simple attack with nitric acid and subsequent precipitation from the nitrates. It is known that for the catalysts of copper chromite type, a heat treatment under hydrogen pressure of the catalyst suspended in a solvent is used, said treatment being named "catalyst activation," and also a preheating of the mixture to be hydrogenated. In the case of Co-Mg catalyst said operations have proved to be superfluous. For the employment of Co-Mg catalyst in hydrogenation of aldehydes, acids and esters, either separately or in admixture, no particular care is foreseen. Also the fact has been ascertained, that the hydrogenation rate, in the presence of Co-Mg catalyst, is remarkably higher than when copper chromite is employed.

The catalyst suitable for the hydrogenation of byproducts of oxosynthesis is constituted of cobalt-magnesium, whereas the couples iron-magnesium and nickel-magnesium have shown weaker activity.

The difference of catalytic action between Co-Mg and other catalysts on the basis of Ni-Mg and Fe-Mg is shown by the results of hydrogenation of oxo-by-products continued in Example 13.

The advantage of Co-Mg catalyst according to this invention in comparison to the so-called Langenbeck catalysts is given by the fact that the latter have not been used and cannot be used profitably in the total hydrogenation of oxosynthesis by-products. The reduction of esters by means of molecular hydrogen is achieved herein with a catalyst constituted of cobaltous oxide and magnesium oxide. A substantial difference between Co-Mg catalyst and Langenbeck catalysts is given by the chemical composition: the catalyst according to the present invention, as it has been shown by X-rays investigation; is constituted of cobaltous oxide and magnesium oxide, which may be obtained by thermic decomposition of the respectively oxalates in inert gas atmosphere. In contrast thereto, in order to obtain the Langenbeck catalysts, the thermic decomposition is carried out in hydrogen stream, which converts the cobaltous oxide to metallic cobalt; metallic cobalt, notoriously, does not give good results in the hydrogenation of esters. The difference between decomposition in hydrogen stream and decomposition in inert gas stream brings success out of failure.

In the coprecipitation of cobalt-magnesium the selection of dibasic organic acids has a precise significance with respect to the course of thermic decomposition of insoluble magnesium and cobalt salts; in fact, the use of dibasic organic acids supplies crystalline precipitates which become decomposed readily by decarboxylation without leaving any organic residue, as above described.

To summarize, the outstanding features of the present invention are:

(1) Co-Mg coprecipitation as salt of a dicarboxylic organic acid (e.g. oxalic, tartaric, succinic and adipic acids);

(2) Preparation of catalyst by coprecipitating mixed Co-Mg salts in equimolecular ratios, or in ratios between 10:1 and 1:2;

(3) Thermic decomposition in inert gas stream;

(4) Decomposition tempertaure between 300° C. and 700° C.;

(5) Physical properties of catalyst and its chemical composition, i.e. cobaltous oxide and magnesium oxide.

I claim:

1. The process of preparing a catalyst for reducing carboxylic compounds by means of molecular hydrogen, which comprises reacting an aqueous solution of a cobalt salt and a magnesium salt with an ammonium salt of a dibasic organic acid selected from the group consisting of oxalic, succinic, adipic, tartaric and phthalic acids, thermally decomposing the resulting precipitate in non-reducing gas stream, said cobalt salt and said magnesium salt being in a molecular ratio between 10:1 and 1:2.

2. The process of preparing a catalyst for reducing carboxylic compounds by means of molecular hydrogen, which comprises reacting an aqueous solution of a cobalt salt and a magnesium salt with an ammonium salt of a dibasic organic acid selected from the group consisting of oxalic, succinic, adipic, tartaric and phthalic acids to form a precipitate, thermally decomposing said precipitate with decarboxylation in an inert gas stream, said cobalt salt and said magnesium salt being in the molecular ratio of 1:1.

3. The process of preparing a catalyst for reducing carboxylic compounds by means of molecular hydrogen, which comprises reacting an aqueous solution of a cobalt salt and a magnesium salt with an ammonium salt of a dibasic organic acid selected from the group consisting of oxalic, succinic, adipic, tartaric and phthalic acids to form a precipitate, thermally decomposing said precipitate in an inert gas stream, at a temperature between about 350° C. and about 700° C.

4. A hydrogenation catalyst consisting of cobaltous oxide and magnesium oxide in a molecular ratio of 10:1 to 1:2 expressed as the nitrates, in a fine crystalline powder, said powder having a specific surface of at least 50,000 sq. cm./g. and average particle diameter less than $5\mu$.

5. The process of preparing hydrogenation catalyst for production of organic oxycompounds to alcohols, said catalyst being composed of cobalt oxide and magnesium oxide in a fine crystalline powder, said powder having a specific surface of at least 50,000 sq. cm./g. and average particle diameter less than $5\mu$, which comprises coprecipitating a cobalt salt and a magnesium salt from aqueous solution of said salts in the molecular ratio between 10:1 and 1:2, and the ammonium salt of a dicarboxylic acid selected from the group consisting of oxalic, succinic, adipic, tartaric and phthalic acids, to form a precipitate, drying said precipitate and thermally treating said precipitate at a temperature between about 300° C. and about 700° C. in a non-reducing gas stream whereby said precipitate is decarboxylated and a mixed oxide catalyst is formed.

References Cited by the Examiner

UNITED STATES PATENTS

| | | | |
|---|---|---|---|
| 1,815,781 | 7/1931 | Kroner | 252—473 X |
| 2,083,795 | 6/1937 | Schiller et al. | 252—473 X |
| 2,093,159 | 9/1937 | Schmidt | 260—638 |
| 2,094,127 | 9/1937 | Lazier | 260—638 |
| 2,110,483 | 3/1938 | Guyer | 260—638 |
| 2,116,552 | 5/1938 | Arnold | 260—638 |
| 2,118,007 | 5/1938 | Covert | 260—638 |
| 2,121,367 | 6/1938 | Schiller | 260—638 |
| 2,121,368 | 6/1938 | Schiller | 260—638 |
| 2,219,042 | 10/1940 | Heckel et al. | 252—473 |
| 2,322,095 | 6/1943 | Schmidt | 260—638 |
| 2,383,643 | 8/1945 | Fulton et al. | 252—473 X |
| 2,500,331 | 3/1950 | Voorhees | 252—473 |
| 2,678,264 | 5/1954 | Corner | 252—473 X |
| 2,767,221 | 10/1956 | Ballard et al. | 260—638 |
| 2,844,633 | 7/1958 | Braconier et al. | 260—638 |
| 2,930,766 | 3/1960 | Lacey | 252—473 |
| 2,967,823 | 1/1961 | Langenbeck et al. | 252—473 X |
| 3,068,290 | 12/1962 | Lichtenberger et al. | 252—473 X |
| 3,114,719 | 12/1963 | Aries | 252—473 X |

FOREIGN PATENTS 320,784   3/1932   Canada.

OTHER REFERENCES

Berkman et al., Catalysis, page 661 (1940).

OSCAR R. VERTIZ, *Primary Examiner.*

LEON ZITVER, MAURICE A. BRINDISI, BENJAMIN HENKIN, *Examiners.*

M. S. JARESZ, G. OZAKI, *Assistant Examiners.*

UNITED STATES PATENT OFFICE
CERTIFICATE OF CORRECTION

Patent No. 3,260,683                        July 12, 1966

Harry Hermann Alfred Endler

It is certified that error appears in the above identified patent and that said Letters Patent are hereby corrected as shown below:

Column 3, line 48, "2-ethylhexanol" should read -- 2-ethylhexenal --.

Signed and sealed this 5th day of August 1969.

(SEAL)
Attest:

Edward M. Fletcher, Jr.                  WILLIAM E. SCHUYLER, JR.
Attesting Officer                              Commissioner of Patents